United States Patent [19]

Foss

[11] 4,175,737
[45] Nov. 27, 1979

[54] STOP MECHANISM

[75] Inventor: Steven K. Foss, Carrollton, Tex.

[73] Assignee: Krestmark Industries, Inc., Lewisville, Tex.

[21] Appl. No.: 918,650

[22] Filed: Jun. 23, 1978

[51] Int. Cl.² .................. B23Q 3/00; B26D 5/28
[52] U.S. Cl. .................. 269/317; 72/461; 83/210; 83/212; 83/369; 83/391; 83/453; 226/33; 269/303; 269/318
[58] Field of Search .................. 226/33, 43; 269/303, 269/304, 305, 315, 317, 319, 320, 318; 83/209, 210, 212, 268, 366, 367, 368, 369, 370, 372, 391, 364, 388, 390; 72/DIG. 21, 15, 36, 389, 461

[56] References Cited

U.S. PATENT DOCUMENTS

| | | | |
|---|---|---|---|
| 2,078,706 | 4/1937 | Boker | 83/391 |
| 2,219,060 | 10/1940 | West | 83/391 |
| 2,646,122 | 7/1953 | MacPheat | 83/391 X |
| 2,749,561 | 6/1956 | Rush | 83/391 X |
| 3,358,539 | 12/1967 | Marszol | 83/391 |
| 3,552,161 | 1/1971 | Garbe et al. | 226/43 |
| 3,763,728 | 10/1973 | Blackman | 83/391 |
| 3,776,078 | 12/1973 | Perlman | 83/210 |

Primary Examiner—Robert Louis Spruill
Assistant Examiner—W. D. Bray
Attorney, Agent, or Firm—Richards, Harris & Medlock

[57] ABSTRACT

An improved stop mechanism for use with machinery wherein a workpiece is advanced through one or more tooling stations comprises an arm supported for limited pivotal movement about orthogonal axes. The arm is constrained for movement within a grooved block and mounted on a pin extending through coaxial conical bores formed in opposite sides of the arm. The arm is biased in a direction opposite to travel of the workpiece to a ready position in sliding contact with the workpiece until the forward end of the arm engages a predetermined notch or locating surface on the workpiece and pivotally moves therewith to a stop position. The rear end of the arm simultaneously actuates a valve, switch or other control device to initiate the desired operation on the workpiece. After completion of the desired operation, the arm is disengaged from the notch or locating surface to release the workpiece and returned to the ready position.

15 Claims, 18 Drawing Figures

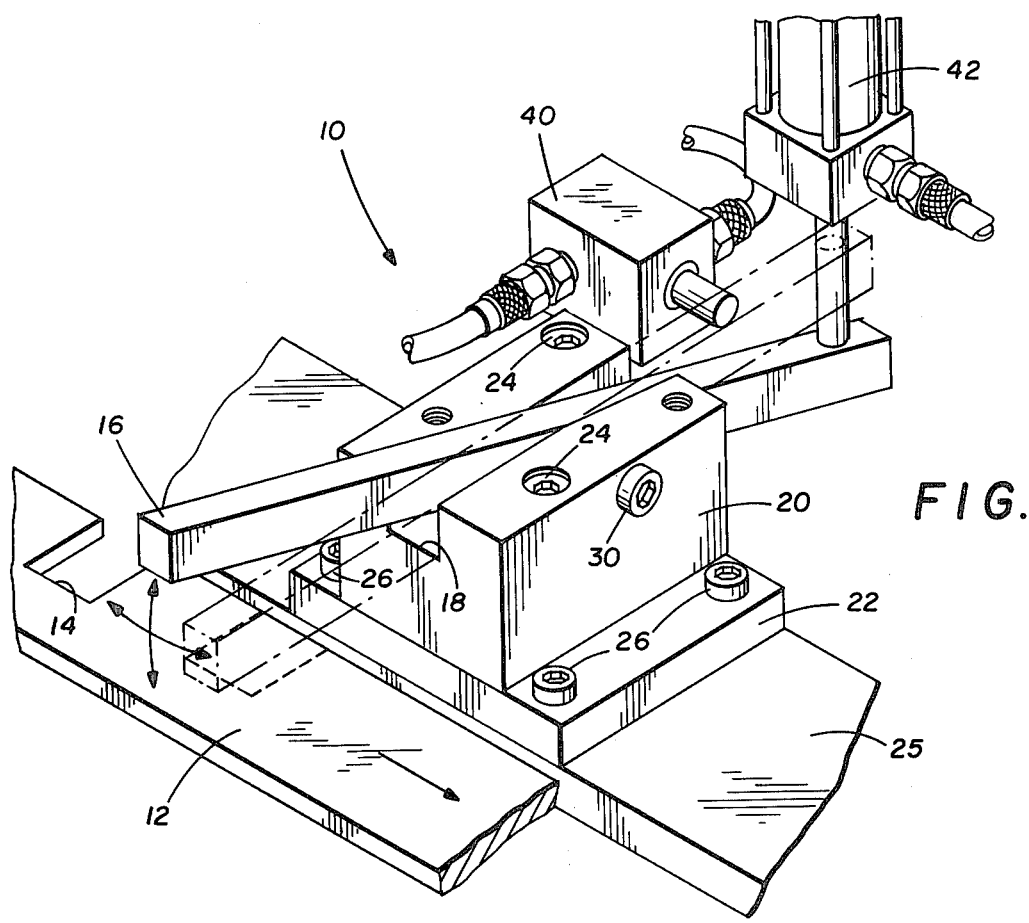
FIG. 1
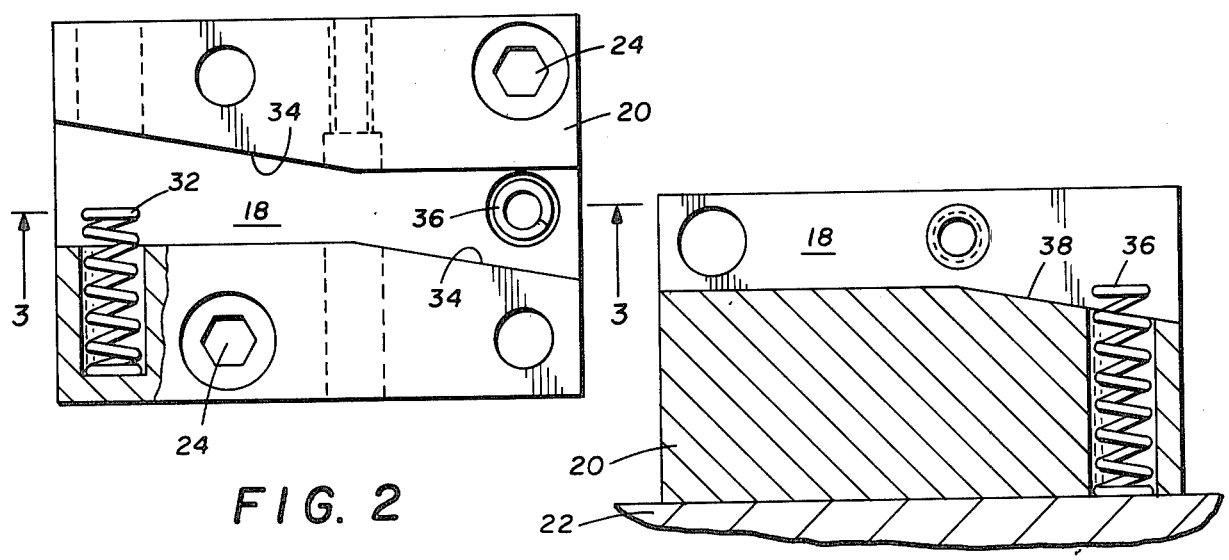
FIG. 2
FIG. 3
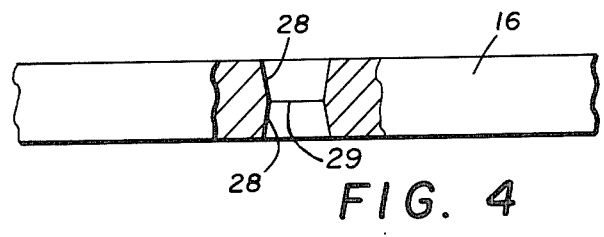
FIG. 4

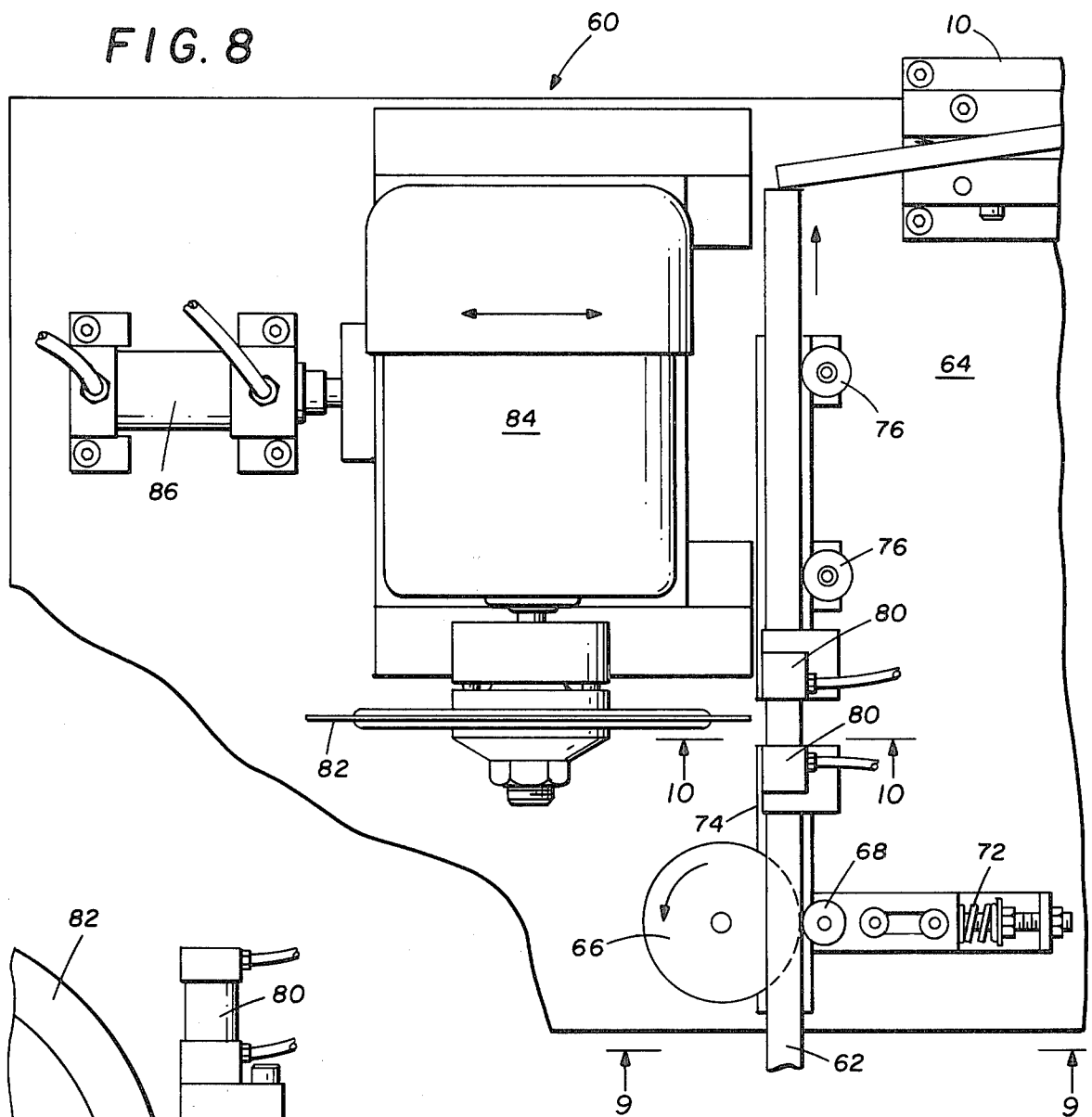

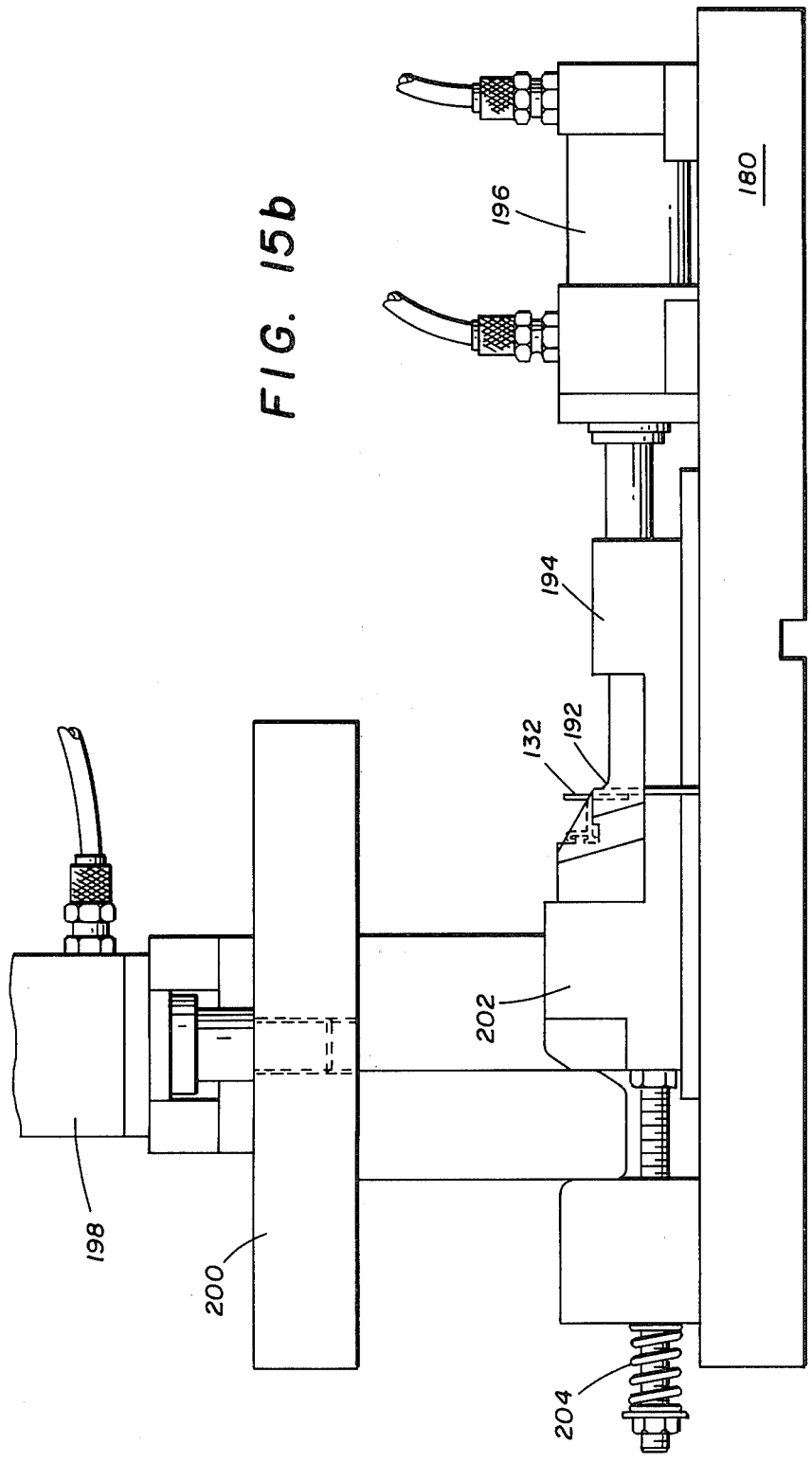

STOP MECHANISM

BACKGROUND AND SUMMARY OF THE INVENTION

The present invention relates in general to a mechanical stop mechanism. More particularly, this invention concerns a precision stop mechanism for use with machinery in which an elongate workpiece is indexed through one or more stations at which various tooling operations are performed.

In automatic or semiautomatic tooling operations, it is extremely important that the workpiece be properly positioned prior to the tooling operation. The problem of properly positioning a workpiece becomes even greater in machinery of the type wherein an elongate workpiece or length of bar stock is incrementally advanced through one or more tooling stations. For example, consider the situation when an extended length of extruded aluminum stock is tooled into a number of relatively smaller pieces, such as frame sections for windows, doors and the like. During this process, the workpiece must be indexed accurately from station to station to achieve the necessary precision, as well as to miminize material waste and therefore expense. The problem of accurately indexing a workpiece is particularly critical when it is subjected to numerous advancements over short distances to produce a large number of relatively small components. The prior art includes various forms of stop mechanisms which have been employed in this indexing function. However, the stop mechanisms heretofore available have been found to be either precise but expensive and lacking in durability, or durable but lacking in precision. There is thus a need for an improved stop mechanism of rugged constuction and precise operation.

The present invention comprises an improved stop mechanism which overcomes the foregoing and other problems associated with the prior art. According to the broader aspects of the invention, there is provided an improved stop mechanism for use with machinery wherein an elongate workpiece is advanced incrementally through one or more tooling stations. The invention includes an arm mounted for limited pivotal movement about first and second axes and between ready and stop positions. In the ready position, the arm is biased into sliding contact with the workpiece. Upon engagement with a notch or other locating surface on the workpiece, the arm is moved to the stop position to halt movement of the workpiece and simultaneously actuate a switch or valve controlling the desired tooling operations. The arm is then disengaged from the workpiece and returned to the ready position permitting advancement of the workpiece again. The invention is characterized by precise operation and durable construction.

In accordance with more specific aspects of the invention, an improved stop mechanism includes an arm having front and back ends. The arm is mounted in a groove on a block by means of a single pin received through an aperture comprising two coaxial conical bores formed in opposite sides of the arm. Predetermined walls of the groove are angled to permit limited pivotal movement of the arm between a ready position and a stop position. Springs are positioned in bores provided in the block to bias the front end of the arm into contact with the workpiece and in a direction opposite to movement of the workpiece. In one embodiment of the stop mechanism, the arm is biased into sliding contact with the upper side of the workpiece, while the arm is biased into contact with the under side of the workpiece in another embodiment of the invention. Upon engagement with a predetermined notch or locating surface on the workpiece, the arm pivots therewith until reaching the stop position. In the stop position, the workpiece is held in positive interfering engagement with the front end of the arm while the back end of the arm actuates a control device to generate a predetermined signal for initiating desired tooling operations on the stationary work piece. The arm is subsequently disengaged from the workpiece with a double-acting cylinder mounted adjacent to the stop mechanism. The workpiece is thereby released for movement and the arm is returned to the ready position by the springs. The stop mechanism of the invention can be employed in automatic or semiautomatic machine tools of the type wherein an extended workpiece, such as a length of extruded aluminum, is incrementally advanced through stations performing notching, cutting, drilling, punching, perforating or other tooling operations to the workpiece between advancements thereof.

DESCRIPTION OF THE DRAWINGS

A more complete understanding of the invention can be had by reference to the following Detailed Description when taken in conjunction with the accompanying Drawings, wherein:

FIG. 1 is a perspective view of one embodiment of the stop mechanism incorporating the invention;

FIG. 2 is a top view of the invention of FIG. 1 in which certain parts have been broken away to illustrate more clearly certain features of the invention;

FIG. 3 is a vertical section view taken along the line 3—3 of FIG. 2 in the direction of the arrows;

FIG. 4 is a partial top view of a part of the invention in which certain portions have been broken away to illustrate more clearly certain features of the invention;

FIG. 8 is a partial top view of a cutting machine tool incorporating the stop mechanism of the invention;

FIG. 9 is an end elevation view taken along the line 9—9 of FIG. 8 in the direction of the arrows;

FIG. 10 is a vertical section view taken along the line 10—10 of FIG. 8 in the direction of the arrows;

FIG. 15b is a vertical section view taken along the line 15b—15b of FIG. 15a in the direction of the arrows.

DETAILED DESCRIPTION

Figure 5:
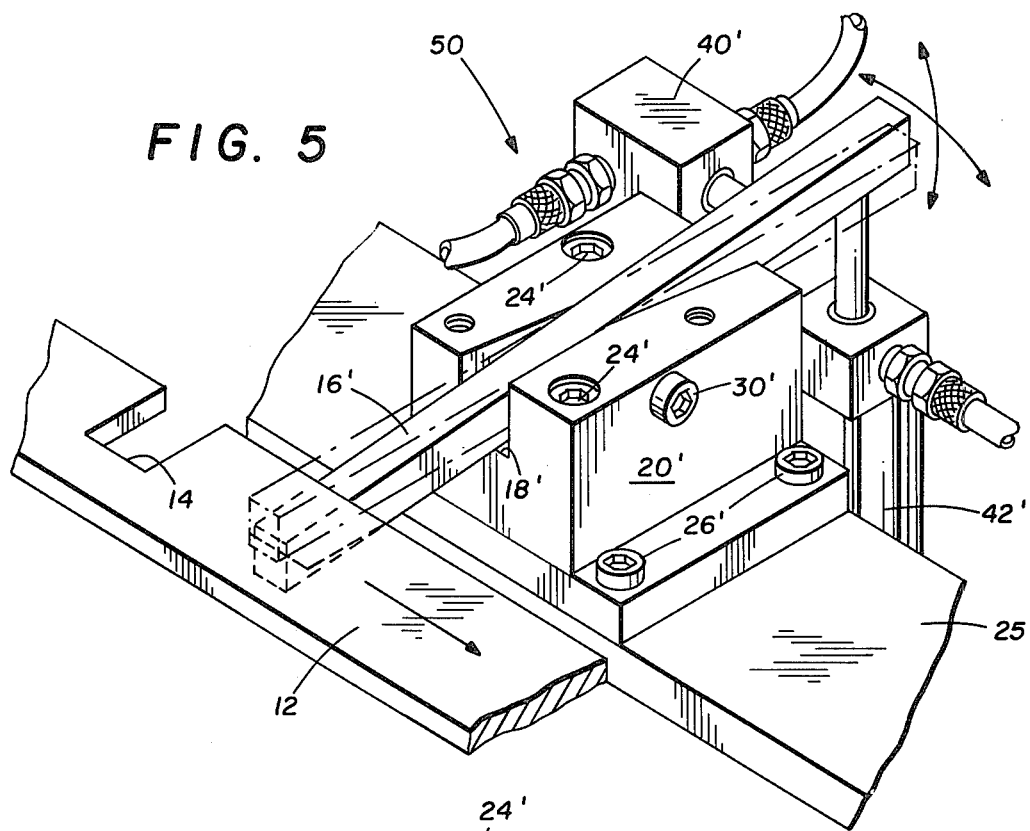
FIG. 5 is a perspective view of a second embodiment of the invention.

Referring now to the Drawings, wherein like reference numerals designate like or corresponding parts throughout the several views, and particularly referring to FIGS. 1-4, there is shown a first embodiment of the stop mechanism 10 of the present invention. Stop mechanism 10 is particularly suited for use with a machine tool wherein an elongate workpiece 12 must be accurately advanced or indexed through one or more tooling stations. For example, workpiece 12 can comprise a length of bar stock, tubing, extruded aluminum or the like. It will be understood that the particular shape of workpiece 12 is not critical to the use of the invention. Preferably, workpiece 12 includes a notch 14 or other type of locating surface provided therein at regular intervals for use in referencing workpiece 12 with stop mechanism 10.

Stop mechanism 10 comprises an arm 16 mounted for limited pivotal movement about mutually perpendicular axes. Arm 16 has been omitted from FIGS. 2 and 3 for clarity. The motion of arm 16 is characterized by a wobble action. Arm 16 is positioned in a groove 18 of predetermined dimensions extending across the upper surface of block 20. Block 20 is preferably demountably attached to a base 22 by means of cap screws 24 extending downwardly therethrough. Base 22 in turn is affixed to a surface 25 extending adjacent to the path of workpiece 12 with cap screws 26. As is best shown in FIG. 4, arm 16 is provided with a predetermined aperture formed by two coaxial conical bores 28 extending inwardly from opposite sides of the arm. Bores 28, thus intersect at a circular edge 29 located within arm 16. Arm 16 is secured to block 20 by means of shoulder screw 30, the cylinder shank of which extends between the side walls of groove 18 and through bores 28. In accordance with the preferred construction, the inwardly converging walls of bores 28 are angled about 10° with respect to the central axis of the aperture formed by said bores. Arm 16 thus has a wobble motion but is pivotally supported at only one point. It will be understood that this comprises a significant feature of the present invention.

Arm 16 of stop mechanism 10 is biased in mutually perpendicular directions to assume a ready position. Compression spring 32, disposed in a cross-bore opening onto groove 18, functions to bias arm 16 in a direction opposite to travel of workpiece 12. That is, the front end of arm 16 is urged by spring 32 in a backward or upstream direction relative to workpiece 12. Opposite ends of opposite sides of the side walls of groove 18 are angled as shown in FIG. 2 to permit limited pivotal movement of arm 16 about a substantially vertical axis. In the preferred construction of the invention, side wall portions 34 of groove 18 are angled approximately 10° from the remaining side wall portions thereof. The front end of arm 16 is also biased downwardly about the horizontal axis by compression spring 36 disposed in a bore opening onto the bottom of groove 18. According to the preferred construction of the invention, back bottom portion 38 of groove 18 is angled downwardly at approximately 10° to permit limited pivotal movement of the front end of arm 16 between a raised position and a substantially horizontal position.

In the operation of stop mechanism 10, the front end of arm 16 is biased forwardly and downwardly by springs 32 and 36, respectively. The front end of arm 16 projects into the path of workpiece 12 for initial contact therewith, whereupon arm 16 is pivoted back until reaching the stop position. In doing so the back end of arm 16 is simultaneously pivoted into engagement with control device 40. For example, control device 40 can comprise a conventional actuator, such as a valve or switch. Actuation of control device 40 by the back end of arm 16 causes generation of a control signal representing that the workpiece 12 is stationary and properly positioned. The signal from control device 40 is utilized to control various conventional tooling operations to workpiece 12.

After completion of the desired tooling operations, arm 16 is pivoted out of stopping engagement with workpiece 12 by double-acting cylinder 42. Upon actuation, the piston rod of cylinder 42 pushes downward the back end of arm 16 to pivot the arm from the position shown in phantom lines in FIG. 1 to the position shown in full lines and release workpiece 12. Springs 32 and 36 then urge the front end of arm 16 forwardly and downwardly to ride on the upper surface of workpiece 12 while the piston rod of cylinder 42 is retracted. Arm 16 is thus placed in a ready position to ride on workpiece 12 until engagement with the next notch 14 or other locating surface. Arm 16 is then moved to the stop position again and control device 40 is again actuated. This sequence continues until completion of the tooling operations on workpiece 12.

Figure 6:
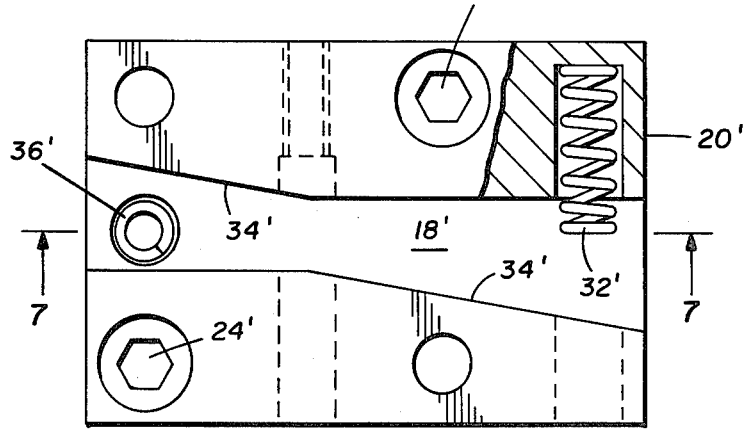
FIG. 6 is a top view of the invention of FIG. 5 in which certain parts have been broken away to illustrate more clearly certain features of the invention.
Figure 7:
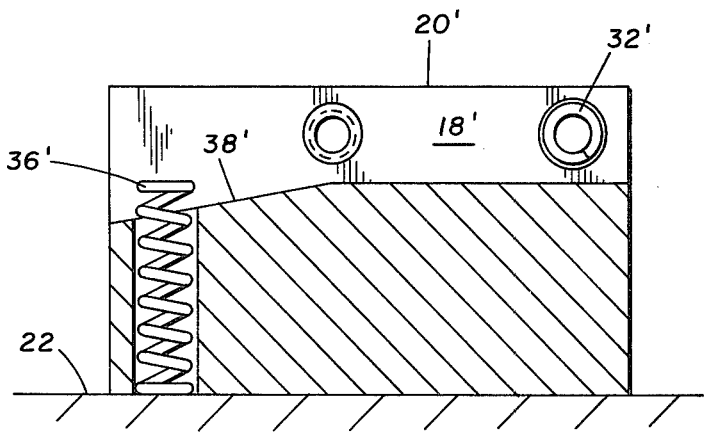
FIG. 7 is a vertical section view taken along the line 7—7 of FIG. 6 in the direction of the arrows.

Referring now to FIGS. 5-7, there is shown a stop mechanism 50 incorporating another embodiment of the invention. Stop mechanism 50 is comprised of components which are substantially identical in construction and in operation to the components of stop mechanism 10 illustrated in FIGS. 1-4. These same components are designated in FIGS. 5-7 with the same reference numeral utilized in the description of stop mechanism 10, but are differentiated therefrom with a prime (') designation.

The chief distinction between stop mechanism 50 and stop mechanism 10 is that arm 16' is adapted to ride underneath workpiece 12 rather than on top of the workpiece. That is, the front end of arm 16' is biased forwardly and upwardly into engagement with workpiece 12. Stop mechanism 50 is particularly suited for use with workpieces having notches or locating surfaces on the underside thereof. In order to do so spring 36' and angled bottom portion 38' of groove 18' are located on the opposite sides of block 20', with respect to the corresponding features in stop mechanism 10. Spring 32' of stop mechanism 50 is similarly located at the opposite end and opposite side of groove 18'. Double acting cylinder 42' is positioned beneath the back end of arm 16' so that the front end of the arm can be selectively actuated downward out of stopping engagement with workpiece 12. Aside from the relocation of some components, stop mechanism 50 functions as described hereinbefore with respect to stop mechanism 10.

Referring now to FIGS. 8-10, there is shown a machine tool 60 incorporating stop mechanism 10 of the present invention. In particular, machine tool 60 functions to cut a workpiece 62 at predetermined intervals. Workpiece 62 is shown in FIGS. 8-10 as a box type extrusion for purposes of illustration only. It will be understood that stop mechanism 10 functions equally well when machine tool 60 is configured to handle other forms of workpieces.

Machine tool 60 is mounted on a bench surface 64 and includes conventional structure defining a path for workpiece 62. Workpiece 62 is engaged between feed roller 66 and idler roller 68 for advancement through tool 60. Feed roller 66 is driven by motor 70 which can be either of the electric or pneumatic type. Idler roller 68 is mounted on a slotted bracket and is biased into firm engagement with feed roller 66 by compression spring 72. Work piece 62 is supported on guide structure 74 and advanced past guide rollers 76 toward stop mechanism 10. Responsive to stopping engagement between workpiece 62 and stop mechanism 10, feed motor 70 is deactuated. Clamp pads 78 connected to double acting cylinders 80 are lowered to firmly clamp stopped workpiece 62 against guide structure 74 on both sides of a separation therein. A rotating saw blade 82 is then caused to at least partially traverse workpiece 62 between clamp cylinders 80. Saw blade 82 is driven by motor 84, which is slidably mounted on bench surface 64. A double-acting cylinder 86 is coupled between bench surface 64 and motor 84 to selectively actuate rotating saw blade 82 across the path of workpiece 62 to effect cutting. Blade 82 and motor 84 are shown in FIG. 8 in the retracted position. Stop mechanism 10 subsequently releases workpiece 62 in a manner hereinbefore described to permit another advancement of the workpiece. It will thus be apparent that stop mechanism 10 can be employed in combination with a machine tool performing a cutting or cutoff function.

Figures 11, 12:
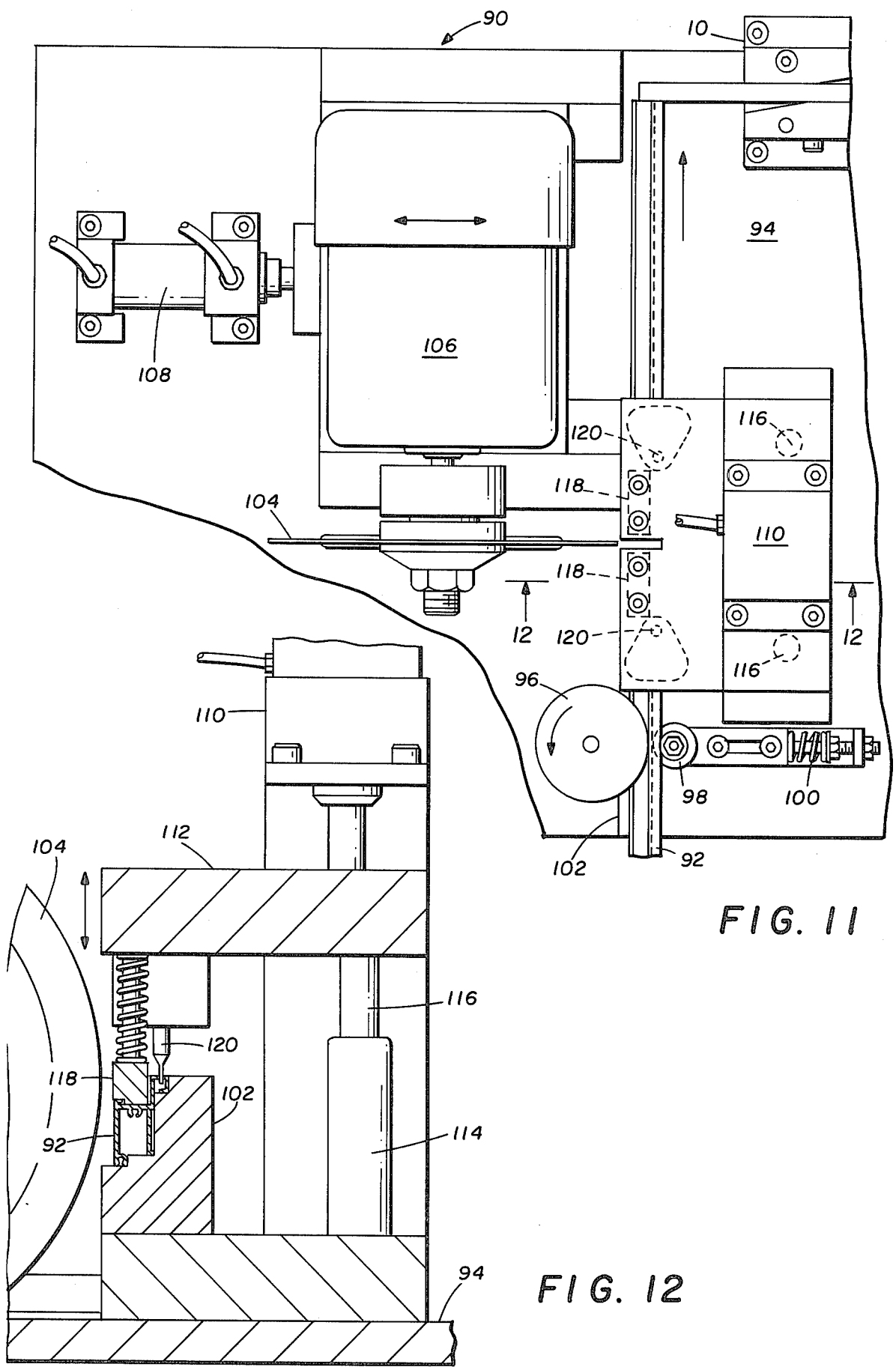
FIG. 11 is a plan view of a cutting and vertical punching machine tool incorporating the stop mechanism of the invention.
FIG. 12 is a vertical section view taken along the line 12—12 of FIG. 11 in the direction of the arrows.

Referring now to FIGS. 11 and 12, there is shown a machine tool 90 incorporating stop mechanism 10 of the present invention. Machine tool 90 performs both cutting and vertical punching operations on workpiece 92. Workpiece 92 can comprise an extended length of stock from which relatively shorter pieces are cut. For purposes of illustration, workpiece 92 is depicted in FIGS. 11 and 12 as a box type extrusion.

The components of machine tool 90 are mounted on a bench surface 94 to define a path over which workpiece 92 is guided. Workpiece 92 is engaged between driven feed roller 96 and idler roller 98 for advancement through machine tool 90. Roller 98 is mounted for biased engagement responsive to compression spring 100 in a manner depicted in FIG. 9 and hereinbefore described in reference to machine tool 60. Workpiece 92 is advanced on guide structure 102 until halted by stop mechanism 10. Responsive to engagement between workpiece 92 and stop mechanism 10, feed roller 96 is deactuated and tooling operations on the stopped workpiece are initiated. A revolving saw blade 104 driven by motor 106 is caused to traverse at least a portion of workpiece 92 at a separation provided in guide structure 102. Motor 106 is conventionally mounted for sliding movement relative to the path of workpiece 92 responsive to double-acting cylinder 108 coupled between bench surface 94 and the motor. Blade 104 and motor 106 are shown in FIG. 11 in a retracted position.

Substantially simultaneously with the cutting operation, double-acting cylinder 110 is actuated to move cross member 112 downwardly. Cross member 112 is mounted for vertical movement by sliding engagement between stationary bushings 114 and pins 116 mounted on the cross member. As cross member 112 decends, clamp shoes 118 are first brought into biased engagement with workpiece 92, followed by punches 120.

Cross member 112, which is shown in the down position in FIG. 12, is then raised to free workpiece 92 at the completion of the cutting and punching operation. Stop mechanism 10 is also disengaged in the manner hereinbefore described to release workpiece 92 for advancement. It will thus be apparent that stop mechanism 10 can be utilized in combination with a cutting/vertical punching machine tool.

Figure 13A:
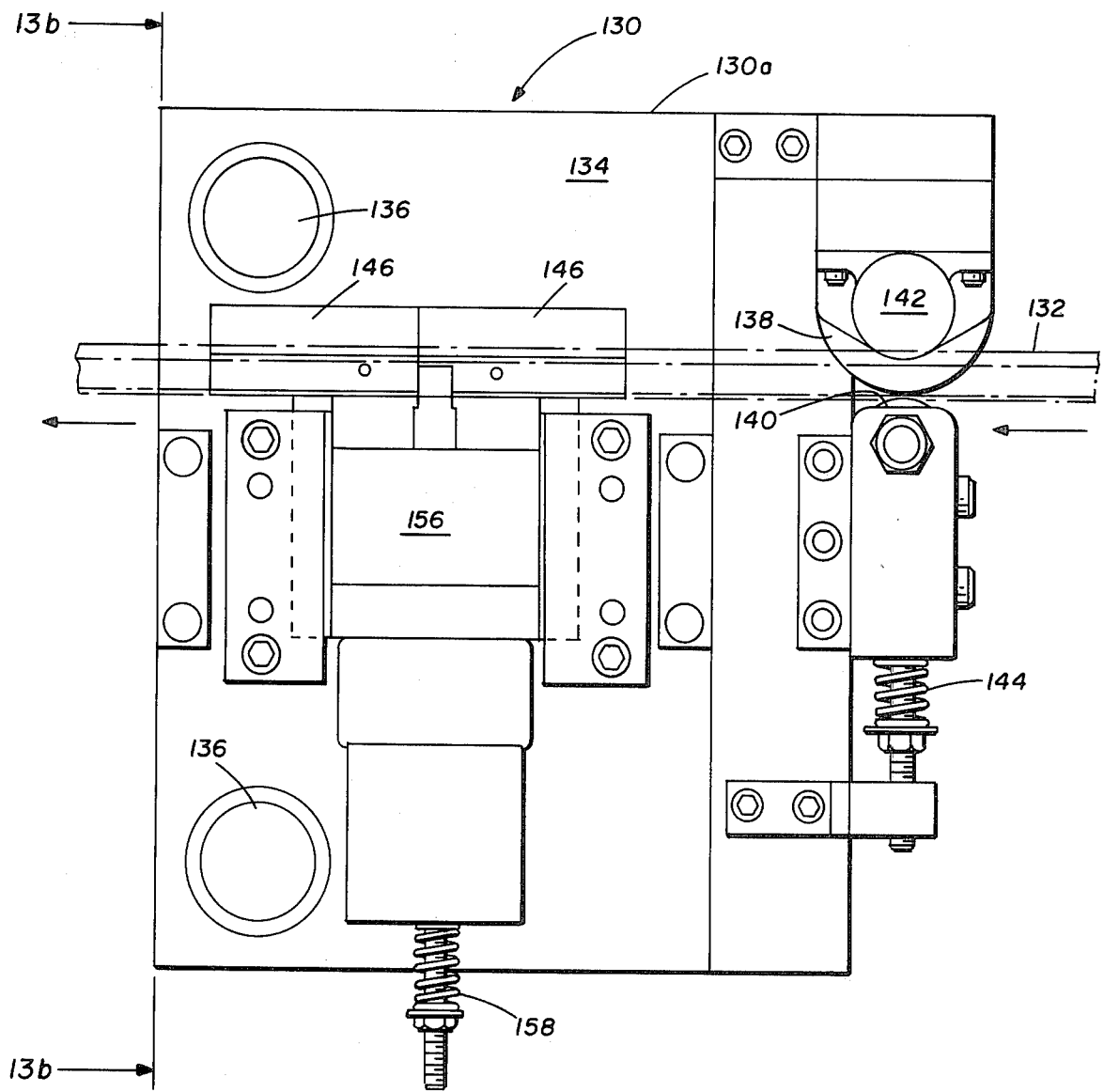
FIG. 13a is a plan view of the vertical notching and punching station of a machine tool incorporating two stop mechanisms of the invention.
Figure 13B:
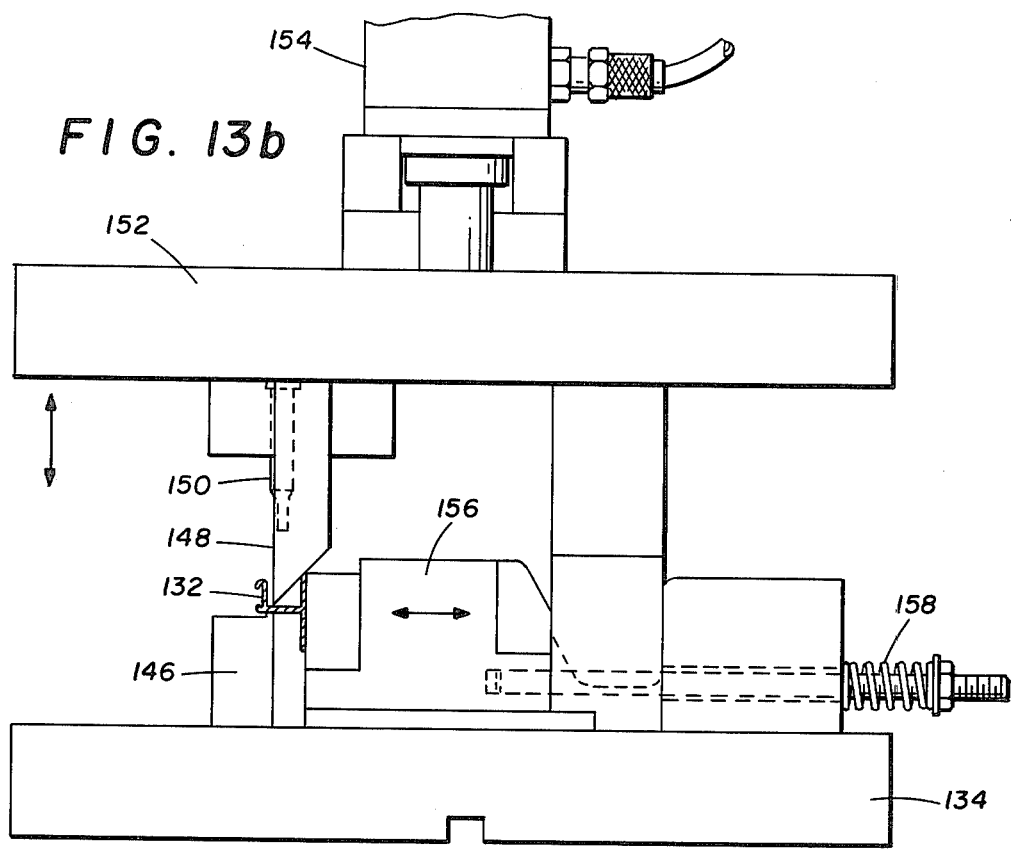
FIG. 13b is a vertical section view taken along the line 13b—13b of FIG. 13a in the direction of the arrows.

Referring now to FIGS. 13a and b, 14a and b, and 15a and b, there is shown another machine tool 130 incorporating stop mechanism 10 of the invention. Machine tool 130 performs multiple notching, shearing and punching operations on workpiece 132 and utilizes two stop mechanisms 10. For purposes of illustration, workpiece 132 is shown as a length of extruded material, such as aluminum. Of course, machine tool 130 can be configured to handle workpieces or bar stock of various types with little or no modification to stop mechanism 10. Machine tool 130 comprises three stations arranged along the path of workpiece 132.

FIGS. 13a and b show the first station 130a of machine tool 130. Station 130a includes a base 134 positioned over locating pins 136 projecting from a table or work surface (not shown). Workpiece 132 is engaged between input feed roller 138 and idler roller 140 for advancement. Feed roller 138 is driven by motor 142 which can be of either the electric or pneumatic type. Idler roller 140 is slightably mounted in a conventional manner relative to feed roller 138. Firm engagement of workpiece 132 between rollers 138 and 140 is maintained by compression spring 144. Workpiece 132 is advanced by input feed roller 138 over guide structure 146 and into engagement with first stop mechanism 10 shown in FIG. 14a.

Responsive to stopping engagement between workpiece 132 and first stop mechanism 10, punches 148 and 150 are moved downwardly into contact with the workpiece. Punches 148 and 150 are mounted for movement with member 152 coupled to double acting cylinder 154. Member 152 is slidably supported on vertical rods (not shown) for movement relative to workpiece 132. Either a hydraulic or a pneumatic device can be used for cylinder 154. As member 152 decends, support block 156 is simultaneously cammed into engagement with a lateral side of workpiece 132 as a notch and two holes are punched by punches 148 and 150, respectively. Retraction of member 152 removes punches 148 and 150, and block 156 is withdrawn by compression spring 158. Workpiece 132 is thus ready for advancement to the next station.

Figure 14B:
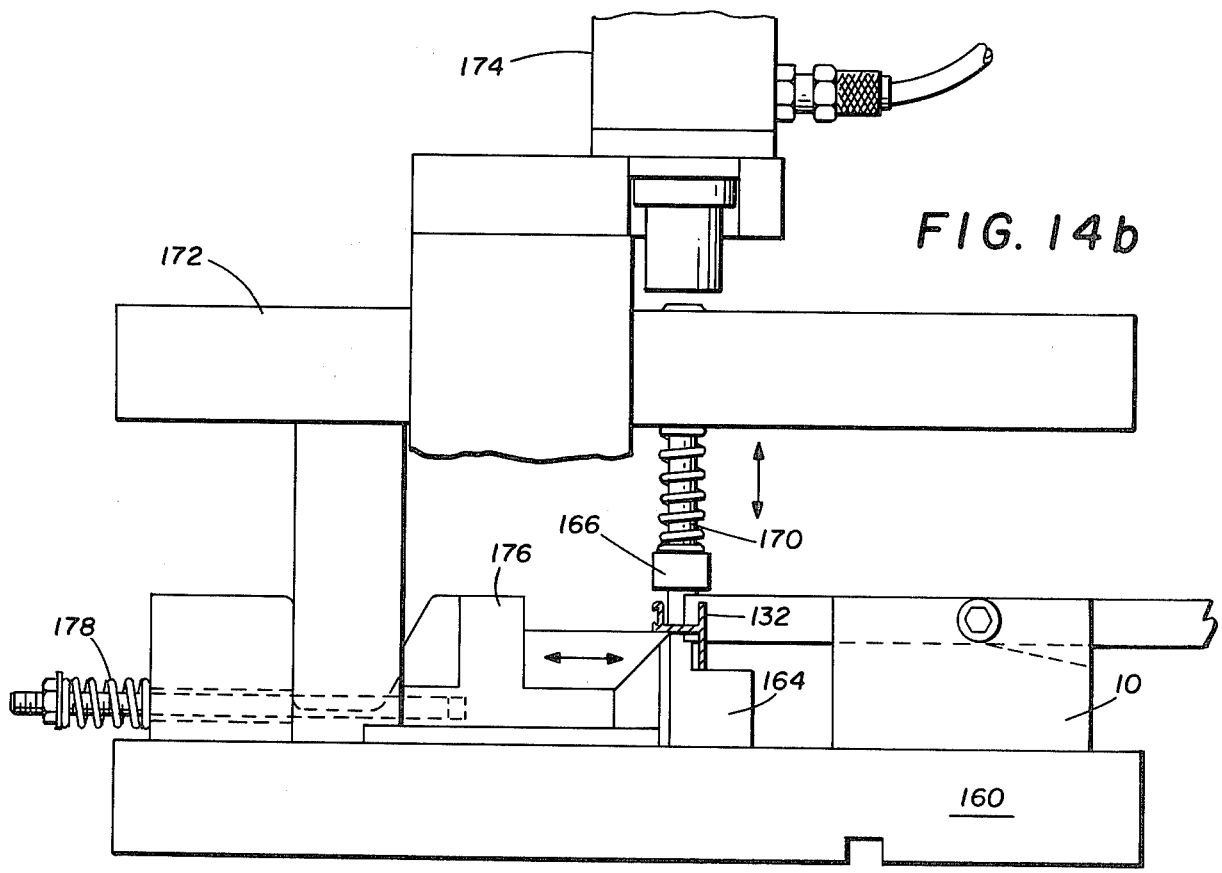
FIG. 14b is a vertical section view taken along the line 14b—14b of FIG. 14a in the direction of the arrows.
Figure 14A:
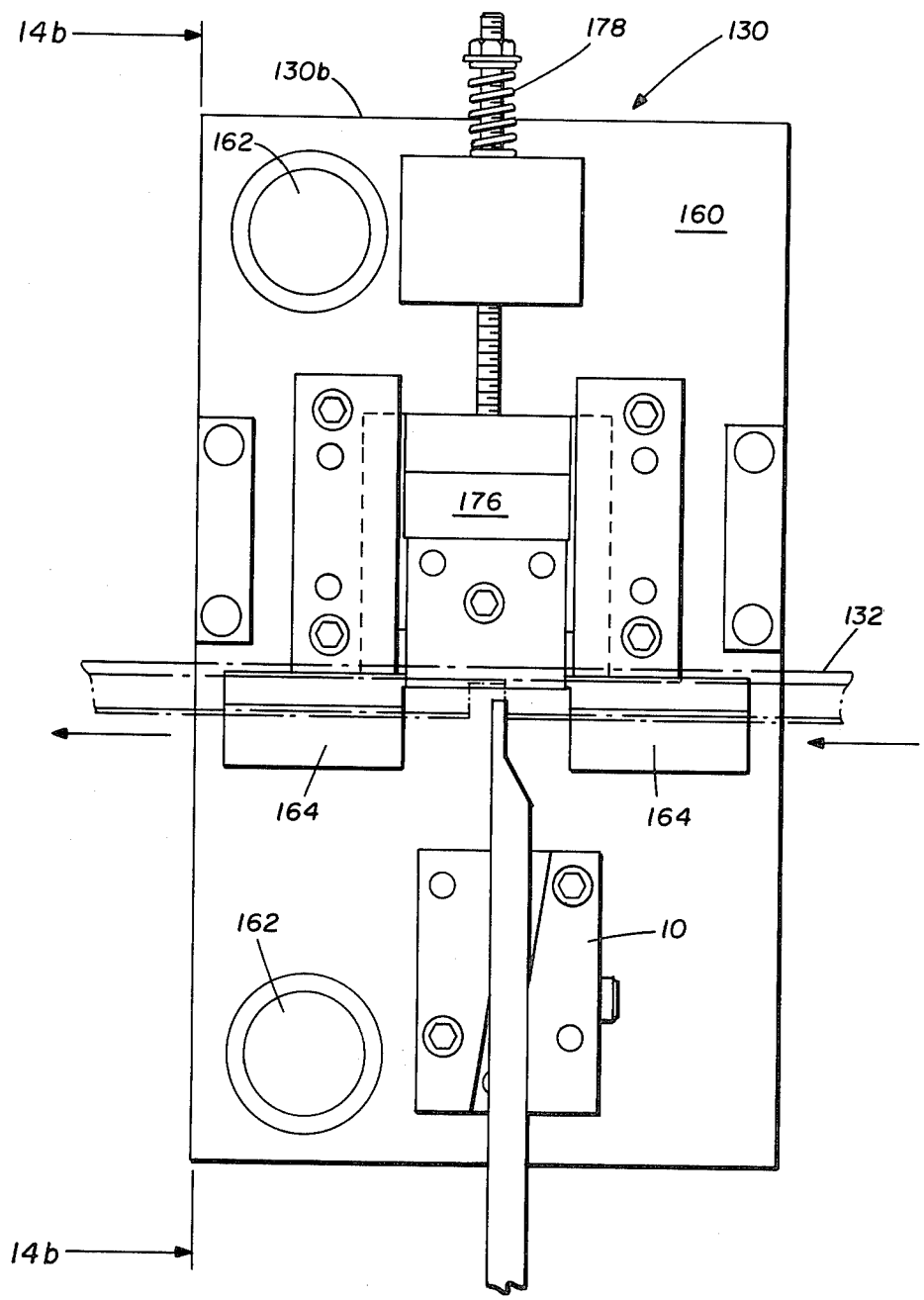
FIG. 14a is a continuation of FIG. 13a showing a plan view of the horizontal punching station in a machine tool incorporating two stop mechanisms of the invention.

FIGS. 14a and b show the second station 130b of machine tool 130. Station 130b includes a base 160 positioned on locating pins 162 extending from a suitable table or work surface. The workpiece 132 received from station 130a is advanced on guide structure 164 into engagement with first stop mechanism 10. As is best shown in FIG. 14b, stripper pad 166 is first brought into contact with workpiece 132. Pad 166 is biased downwardly on tool 170 extending from member 172. Member 172 is mounted for vertical movement on rods (not shown) responsive to actuation by double-acting cylinder 174. Upon descent of tool 170 and member 172, block 176 is cammed or wedged inwardly into supporting engagement with workpiece 132. Tool 170 then engages workpiece 132 to form a fold, crease, upset or the like. Upon retraction of cylinder 174, block 176 is withdrawn also by compression spring 178. Following disengagement of first stop mechanism 10, workpiece 132 is again free for advancement.

Figure 15A:
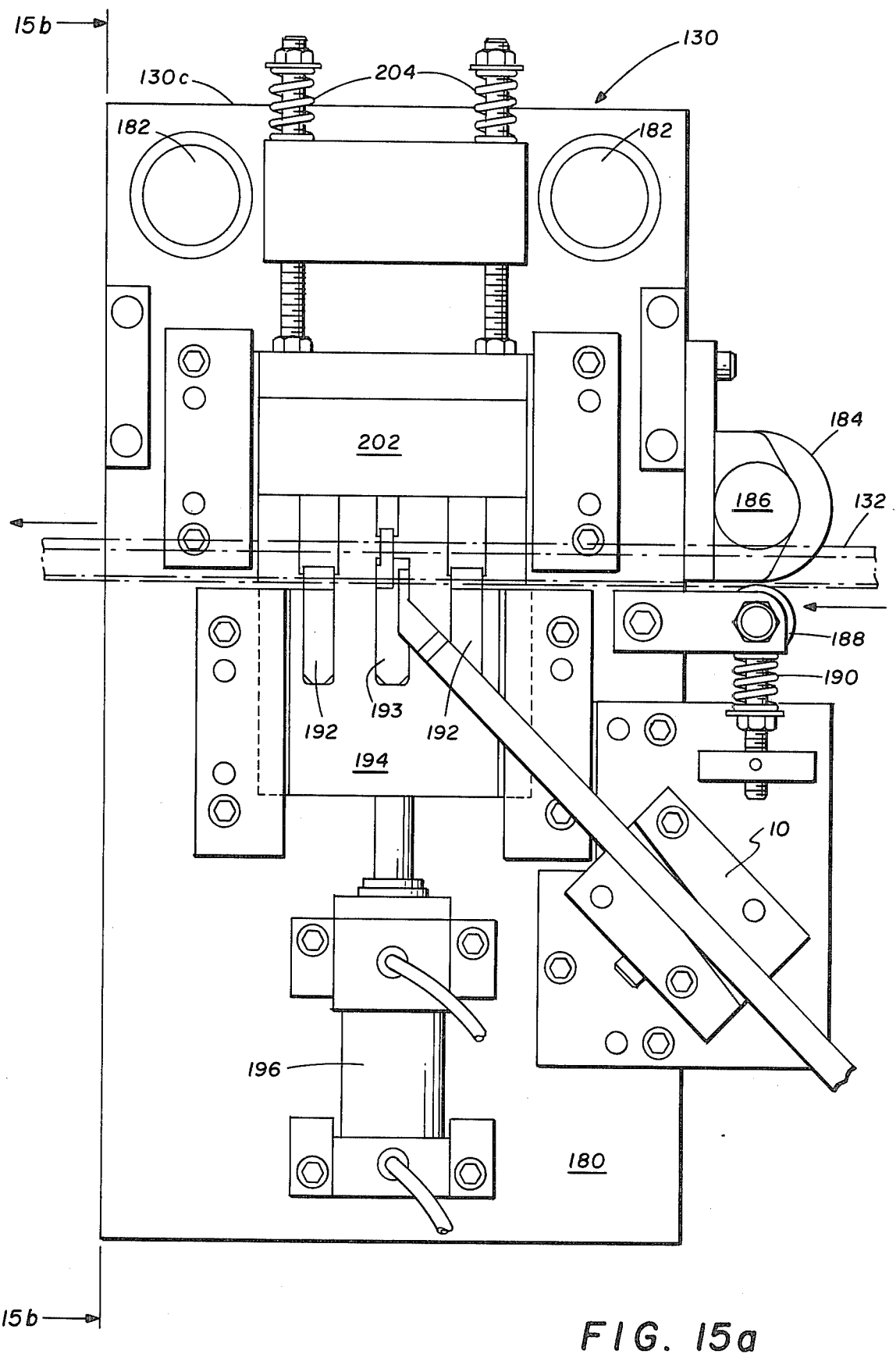
FIG. 15a is a continuation of FIG. 14a showing a plan view of a horizontal notching, punching and shearing station in a machine tool incorporating two stop mechanisms of the invention.

FIGS. 15a and b show third station 130c of machine tool 130. Station 130c functions to provide horizontal notches and a shear cutoff in workpiece 132. Station 130c includes a base 180 which receives locating pins 182 extending upwardly from a suitable table or work surface. Station 130c further includes an output feed roller 184, which is preferably synchronized with input feed roller 138 shown in FIG. 13a. Roller 184 is driven by motor 186. Workpiece 132 is biased by idler roller 188 into firm engagement with feed roller 184. Roller 188 is mounted for movement relative to workpiece 132 in a conventional manner at the urging of compression spring 190.

Workpiece 132 is advanced by output feed roller 184 over guide structure and into engagement with second stop mechanism 10. Two punches 192 and one shear 193 are secured to block 194. Block 194 is mounted for sliding movement on base 180 responsive to actuation of double-acting cylinder 196. Preferably, double-acting cylinder 198 is actuated simultaneously with cylinder 196. Cylinder 198 is coupled to member 200 which is mounted for vertical movement on pins (not shown). Downward actuation of member 200 cams or wedges block 202 into engagement behind workpiece 132. Block 202 includes profiles complimentary with punches 192 and shear 193 so that workpiece 132 is smoothly notched and sheared between the notches as desired. Blocks 194 and 202 thus substantially simultaneously engage workpiece 132 from opposite sides. Retraction of member 200 permits withdrawal of block 202 by compression springs 204. Retraction of cylinders 196 and 198, together with disengagement of stop mechanism 10 in the manner hereinbefore described, permits advancement of workpiece 132 and collection of the tooled pieces for subsequent use. It will thus be apparent that one or more stop mechanisms 10 can be employed in a machine tool which performs multiple notching, punching and shearing operations on a workpiece.

In view of the foregoing, it will be understood that the present invention comprises an improved stop mechanism incorporating numerous advantages over the prior art. The stop mechanism is particularly suited for use with machine tools wherein an elongate workpiece or extended length of stock is advanced through several tooling stations, and wherein notches or locating surfaces are employed to reference predetermined advancements of the workpiece. The stop mechanism combines rugged construction with precise operation. Other advantages derived from the use of the invention will readily suggest themselves to those skilled in the art.

Although preferred embodiments of the invention have been illustrated in the accompanying Drawings and described in the foregoing Detailed Description, it will be understood that the invention is not limited to the embodiments disclosed, but is intended to embrace any alternatives, modifications, and rearrangements or substitutions of parts and/or elements as fall within the spirit and scope of the invention.

What is claimed is:

1. For use in controlling advancement of a workpiece along a feed path, a stop mechanism comprising:
   structure located adjacent the feed path and defining a predetermined groove with bottom and side walls;
   an arm supported in the groove for pivotal movement about first and second substantially orthogonal axes;
   said arm being supported about an aperture therethrough defined by inwardly tapered surfaces intersecting at a circular edge between opposite sides of said arm, said circular edge defining means for pivoting said arm about one of said orthogonal axes;
   means for biasing the front end of the arm pivotally about the first axis into engagement with the workpiece;
   means for biasing the front end of the arm pivotally about the second axis in a direction against the feed direction of the workpiece.

2. The stop mechanism of claim 1 wherein the means for biasing the arm pivotally about the first axis comprises a spring disposed in a bore opening onto the bottom wall of the groove.

3. The stop mechanism of claim 1 wherein the means for biasing the arm pivotally about the second axis comprises a spring disposed in a bore opening onto a side wall of the groove.

4. The stop mechanism of claim 1 wherein the bottom wall of the groove is substantially level on one side of the first axis and slopes downwardly at a predetermined angle on the other side of said axis to limit pivotal movement of the arm about said axis.

5. The stop mechanism of claim 1 wherein at least a portion of each side wall diverges at a predetermined angle from the other side wall outwardly from points adjacent the second axis so that the arm is constrained for limited pivotal movement about said axis.

6. The stop mechanism of claim 1 further including means for selectively actuating the front end of the arm pivotally about the first axis.

7. The stop mechanism of claim 1 further including actuator means positioned adjacent one end of the arm for generating a control signal when the arm is pivoted about the second axis into stopping engagement with the workpiece.

8. For use in a machine tool wherein a workpiece is indexed along a feed path, a stop mechanism which comprises:
   structure positioned adjacent the feed path and defining a predetermined groove with bottom and side walls;
   an arm with a front end extending into the feed path of the work piece and a rear end, positioned in the groove and pivotally supported between the ends about substantially perpendicular first and second axes about an opening therethrough defined by inwardly taped surfaces intersecting at a circular edge between opposite sides of said arm, said circular edge defining means for pivoting said arm about one of said axes;
   the bottom wall of said groove including an end portion sloping downward at a predetermined angle from a point adjacent to the pivotal mounting of the arm to constrain said arm for limited pivotal movement about the first axis;
   each of the side walls of said groove including an end portion diverging from the opposite side wall at a predetermined angle from a point adjacent to the pivotal mounting of the arm to constrain said arm for limited pivotal movement about the second axis;

means for biasing the front end of the arm about the second axis in a direction against the feed direction of the workpiece;

means for biasing the front end of the arm about the first axis into engagement with the workpiece.

9. The stop mechanism of claim 8 wherein the means for biasing the arm about the first axis comprises a spring disposed in a bore provided in the bottom wall of the groove at a point spaced from the pivotal mounting of the arm.

10. The stop mechanism of claim 8 wherein the means for biasing the arm about the second axis comprises a spring disposed in a bore provided in a side wall of the groove at a point spaced from the pivotal mounting of the arm.

11. The stop mechanism of claim 8 further including means for selectively actuating the front end of said arm about the first axis and out of engagement with the workpiece.

12. The stop mechanism of claim 8 further including actuator means positioned adjacent one end of the arm for generating a control signal when the arm is engaged and pivoted thereagainst about the second axis by the workpiece.

13. In combination with a machine tool of the type which performs at least one cutting operation on an elongate workpiece having at least one locating surface thereon and being advanced along a predetermined feed path, an improved stop mechanism comprising:

a block located adjacent to the feed path with a predetermined groove having a bottom wall and two spaced apart side walls extending across the upper surface of said block;

an arm positioned in the groove in said block with a front end projecting into the feed path and a back end, said arm including a predetermined aperture for support thereof within said block, said aperture being defined by inwardly tapered surfaces intersecting at a circular edge between opposite sides of said arm;

a pin with a longitudinal axis extending through the aperture in said arm and between the side walls of the groove for pivotally securing said arm to said block;

the bottom wall of the groove in said block including an end portion sloping downwardly at a predetermined angle from a point adjacent said pin to limit pivotal movement of said arm about a first axis comprising the axis of said pin;

each of the side walls of the groove in said block including an end portion diverging from the opposite side wall at a predetermined angle from a point adjacent said pin to limit pivotal movement of said arm about a second axis extending substantially perpendicularly to the first axis said second axis being defined by said circular edge;

a first spring disposed in a bore extending into the bottom wall of the groove in said block for biasing the front end of said arm about the first axis into pivotal engagement with the workpiece and each locating surface therein;

a second spring disposed in a bore extending into one of the side walls of the groove in said block for biasing the front end of said arm about the second axis in a direction opposite to the direction of the workpiece along the feed path;

means located adjacent said block for selectively actuating the front end of said arm about the first axis out of engagement with the workpiece and in opposition to the first spring; and actuator means positioned adjacent one end of said arm for sensing when the front end of said arm has become stoppingly engaged with a locating surface on the workpiece.

14. In combination with a machine tool of the type which performs at least one punching operation on an elongate workpiece having at least one locating surface thereon and being advanced along a predetermined feed path, an improved stop mechanism comprising:

a block located adjacent to the feed path with a predetermined groove having a bottom wall and two spaced apart side walls extending across the upper surface of said block;

an arm positioned in the groove in said block with a front end projecting into the feed path and a back end, said arm including a predetermined aperture for support thereof within said block, said aperture being defined by inwardly tapered surfaces intersecting at a circular edge between opposite sides of said arm;

a pin with a longitudinal axis extending through the aperture in said arm and between the side walls of the groove for pivotally securing said arm to said block;

the bottom wall of the groove in said block including an end portion sloping downwardly at a predetermined angle from a point adjacent said pin to limit pivotal movement of said arm about a first axis comprising the axis of said pin;

each of the side walls of the groove in said block including an end portion diverging from the opposite side wall at a predetermined angle from a point adjacent said pin to limit pivotal movement of said arm about a second axis extending substantially perpendicularly to the first axis said second axis being defined by said circular edge;

a first spring disposed in a bore extending into the bottom wall of the groove in said block for biasing the front end of said arm about the first axis into pivotal engagement with the workpiece and each locating surface therein;

a second spring disposed in a bore extending into one of the side walls of the groove in said block for biasing the front end of said arm about the second axis in a direction opposite to the direction of the workpiece along the feed path;

means located adjacent said block for selectively actuating the front end of said arm about the first axis out of engagement with the workpiece and in opposition to the first spring; and actuator means positioned adjacent one end of said arm for sensing when the front end of said arm has become stoppingly engaged with a locating surface on the workpiece.

15. In combination with a machine tool of the type which performs at least one punching operation and at least one shearing operation on an elongate workpiece having at least one locating surface thereon and being advanced along a predetermined feed path, an improved stop mechanism comprising:

a block located adjacent to the feed path with a predetermined groove having a bottom wall and two spaced apart side walls extending across the upper surface of said block;

an arm positioned in the groove in said block with a front end projecting into the feed path and a back end, said arm including a predetermined aperture for support thereof within said block, said aperture being defined by inwardly tapered surfaces intersecting at a circular edge between opposite sides of said arm;

a pin with a longitudinal axis extending through the aperture in said arm and between the side walls of the groove for pivotally securing said arm to said block;

the bottom wall of the groove in said block including an end portion sloping downwardly at a predetermined angle from a point adjacent said pin to limit pivotal movement of said arm about a first axis comprising the axis of said pin;

each of the side walls of the groove in said block including an end portion diverging from the opposite side wall at a predetermined angle from a point adjacent said pin to limit pivotal movement of said arm about a second axis extending substantially perpendicularly to the first axis said second axis being defined by said circular edge;

a first spring disposed in a bore extending into the bottom wall of the groove in said block for biasing the front end of said arm about the first axis into pivotal engagement with the workpiece and each locating surface therein;

a second spring disposed in a bore extending into one of the side walls of the groove in said block for biasing the front end of said arm about the second axis in a direction opposite to the direction of the workpiece along the feed path;

means located adjacent said block for selectively actuating the front end of said arm about the first axis out of engagement with the workpiece and in opposition to the first spring; and actuator means positioned adjacent one end of said arm for sensing when the front end of said arm has become stoppingly engaged with a locating surface on the workpiece.

* * * * *